United States Patent
Narra et al.

(10) Patent No.: US 9,809,323 B2
(45) Date of Patent: Nov. 7, 2017

(54) METHODS AND APPARATUS FOR PROVIDING CRITICAL ELECTRONIC CHECKLIST DATA DURING FLIGHT

(71) Applicant: HONEYWELL INTERNATIONAL INC., Morris Plains, NJ (US)

(72) Inventors: Aparna Narra, Andhra Pradesh (IN); Sumit Kumar Gupta, Telangana (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/077,638

(22) Filed: Mar. 22, 2016

(65) Prior Publication Data

US 2017/0275018 A1 Sep. 28, 2017

(51) Int. Cl.
*B64D 45/00* (2006.01)

(52) U.S. Cl.
CPC ...... *B64D 45/00* (2013.01); *B64D 2045/0075* (2013.01)

(58) Field of Classification Search
CPC ............ B64D 45/00; B64D 2045/0075; G06Q 10/06316; G06Q 50/30
See application file for complete search history.

(56) References Cited

U.S. PATENT DOCUMENTS

| | | | |
|---|---|---|---|
| 5,454,074 A * | 9/1995 | Hartel | B64G 1/22 434/50 |
| 5,522,026 A | 5/1996 | Records et al. | |
| 6,086,630 A | 7/2000 | Williams et al. | |
| 6,209,006 B1 | 3/2001 | Medl et al. | |
| 6,262,720 B1 | 7/2001 | Jeffrey et al. | |
| 6,753,891 B1 | 6/2004 | Chohan et al. | |
| 7,392,486 B1 * | 6/2008 | Gyde | B64D 43/00 701/14 |
| 8,497,784 B1 * | 7/2013 | Vandrovec | B64D 43/00 340/945 |
| 8,766,819 B2 | 7/2014 | Dorfmann et al. | |
| 8,838,294 B2 | 9/2014 | Srivastav et al. | |
| 9,002,543 B2 | 4/2015 | Dorneich et al. | |
| 9,002,571 B1 | 4/2015 | Gribble et al. | |
| 9,171,273 B2 | 10/2015 | Thomas | |
| 9,569,323 B1 * | 2/2017 | Gershzohn | G06F 11/2257 |
| 2007/0142980 A1 * | 6/2007 | Ausman | G01D 7/00 701/3 |

(Continued)

FOREIGN PATENT DOCUMENTS

FR 2940480 A1 6/2010

OTHER PUBLICATIONS

NASA, "A Checklist," ASRS, 2015.

(Continued)

*Primary Examiner* — Michael J Zanelli
(74) *Attorney, Agent, or Firm* — Lorenz & Kopf, LLP

(57) ABSTRACT

A method for providing electronic checklist data onboard an aircraft is provided. The method detects, by an aircraft onboard system, a current phase of flight for the aircraft; obtains electronic checklist data by at least one processor onboard the aircraft; identifies, by the at least one processor, critical items associated with the current phase of flight, wherein the electronic checklist data comprises the critical items; and presents the critical items via aircraft display.

16 Claims, 7 Drawing Sheets

(56) References Cited

U.S. PATENT DOCUMENTS

2007/0150119 A1* 6/2007 Mitchell ................ G06Q 50/30
 701/1
2011/0115649 A1 5/2011 Smith et al.
2012/0283897 A1* 11/2012 Barraci .................. G06Q 50/30
 701/3
2015/0298816 A1* 10/2015 Ouellette ............... B64D 43/00
 701/3

OTHER PUBLICATIONS

Ockerman, J., et al "A Review and Reappraisal of Task Guidance: Aiding Workers in Precedure Following," International Journal of Cognitive Ergonomics, School of Industrial and Systems Engineering, Mar. 2014.

Extended EP Search Report for Application No. 17155934.7-1958 dated Jun. 4, 2017.

Degani, A., et al. "Cockpit Checklists:Concepts, Design, and Use," San Jose State University Foundation, University of Miami, Human Factors 35(2), 1993, pp. 28-43.

Ockerman, Jennifer, et al. "A Review and Reappraisal of Task Guidance: Aiding Workers in Procedure Following," International Journal of Cognitive Ergonomics, School of Industrial and Systems Engineering, 2000, 4(3), 191-212.

\* cited by examiner

METHODS AND APPARATUS FOR PROVIDING CRITICAL ELECTRONIC CHECKLIST DATA DURING FLIGHT

TECHNICAL FIELD

Embodiments of the subject matter described herein relate generally to the presentation of electronic checklist data onboard an aircraft. More particularly, embodiments of the subject matter relate to displaying critical electronic checklist data during flight.

BACKGROUND

In a standard flight operation, flight crews are expected to follow a set of standard procedures to check aircraft operational status. These procedures are listed together in the form of a checklist, which includes specific tasks that assist the flight crew to verify the aircraft status and manage aircraft systems for safe operations. The goal of electronic checklist is to reduce the flight crew workload by visually providing the information that will be required during execution of the checklist procedures. During a high stress, high workload situation, flight crew members could potentially overlook an important electronic checklist task that is tied to a particular phase of flight. However, the checklist procedures are independent and the flight crew can access the checklist procedures irrespective of the phase of flight. Commonly used electronic checklist systems do not restrict the flight crew from entering into the next phase of flight without completing the checklist procedures of the current phase of flight. It is possible that flight crew members could complete electronic checklist tasks outside of the appropriate phase of flight, simply to complete the task and check it off the list.

Accordingly, it is desirable to provide a mechanism for informing a flight crew of critical tasks associated with a particular phase of flight. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing electronic checklist data onboard an aircraft. The method detects, by an aircraft onboard system, a current phase of flight for the aircraft; obtains electronic checklist data by at least one processor onboard the aircraft; identifies, by the at least one processor, critical items associated with the current phase of flight, wherein the electronic checklist data comprises the critical items; and presents the critical items via aircraft display.

Some embodiments provide a system for providing electronic checklist data onboard an aircraft. The system includes a system memory element, configured to store an electronic checklist database; an aircraft display device configured to present critical items from the electronic checklist database; and at least one processor, communicatively coupled to the system memory element and the aircraft display device, the at least one processor configured to: access electronic checklist data stored by the system memory element; identify critical items associated with a current phase of flight, wherein the electronic checklist data comprises the critical items; and transmit the critical items to the aircraft display for presentation.

Some embodiments provide a non-transitory, computer-readable medium containing instructions thereon, which, when executed by a processor, perform a method. The method identifies critical tasks from an electronic checklist applicable to an aircraft, wherein the critical tasks comprise electronic checklist items requiring completion during a current phase of flight; and presents the critical tasks via aircraft display onboard the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure provides systems and methods for identifying and presenting critical items (i.e., critical tasks) from an electronic checklist used by a flight crew during preparation for, and execution of, flight operations onboard an aircraft. Critical items are flagged, or identified in some other way, in an electronic checklist database. An electronic checklist graphical user interface (GUI) is presented via an aircraft onboard display, in which a phase of flight may be selected, critical items associated with the selected phase of flight may be displayed, and a summary of information useful for performing a critical task may be presented when the critical task is selected via the GUI.

Certain terminologies are used with regard to the various embodiments of the present disclosure. An electronic checklist is a set of standard procedures used to verify aircraft operational status and/or to manage aircraft systems for safe operation. An electronic checklist may include both critical and non-critical items. A critical item is a task included in an electronic checklist which is associated with a particular phase of flight, and which must be completed prior to the end of the associated phase of flight in order to operate the aircraft safely. A phase of flight is an operational period within a flight, and may include, without limitation: standing (STD), pushback/towing (PBT), taxi (TXI), takeoff (TOF), initial climb (ICL), en route (ENR), maneuvering (MNV), approach (APR), landing (LDG), emergency descent (EMG), uncontrolled descent (UND), post-impact (PIM), and/or various sub-categories of these.

Figure 1:
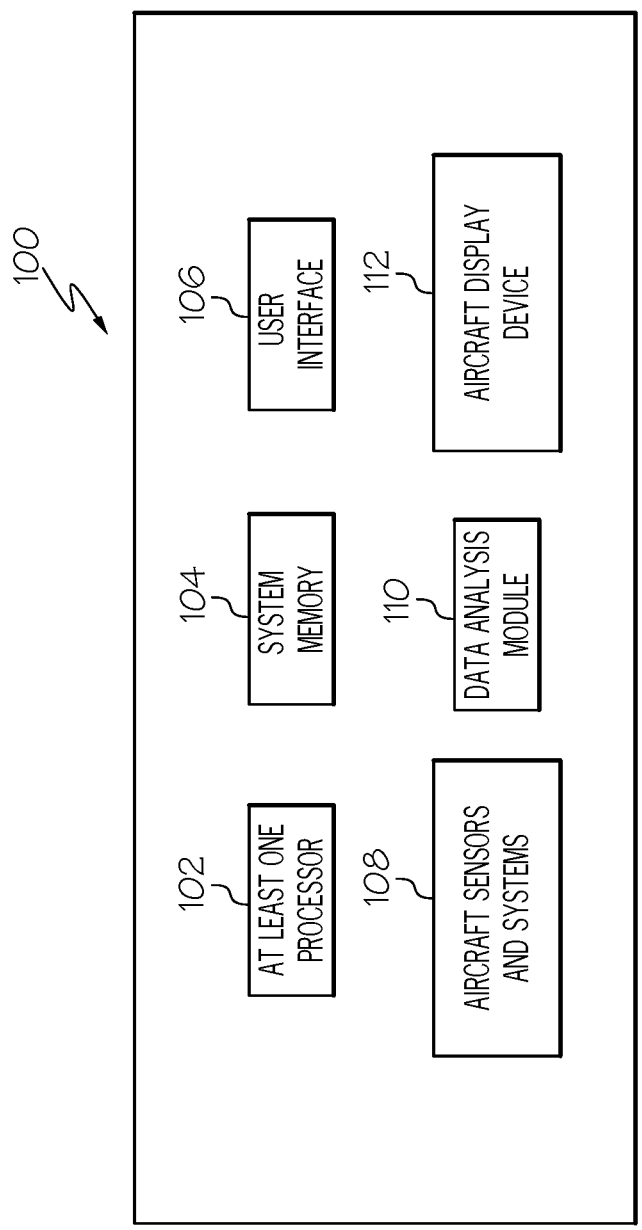
FIG. 1 is a functional block diagram of a critical task alert system, in accordance with the disclosed embodiments.

Turning now to the figures, FIG. 1 is a functional block diagram of a critical task alert system 100, in accordance with the disclosed embodiments. The critical task alert system 100 may be implemented using an aircraft onboard computer system, an electronic flight bag (EFB) software application, an avionics processor card, or other processor-based computer system compatible for use onboard an aircraft. The critical task alert system 100 generally includes, without limitation: at least one processor 102; system memory 104; a user interface 106; various aircraft sensors and systems 108; a data analysis module 110; and at least one aircraft display device 112. These elements and features of the critical task alert system 100 may be operatively associated with one another, coupled to one another, or otherwise configured to cooperate with one another as needed to support the desired functionality—in particular, filtering and presenting critical tasks to the flight crew, as described herein. For ease of illustration and clarity, the various physical, electrical, and logical couplings and interconnections for these elements and features are not depicted in FIG. 1. Moreover, it should be appreciated that embodiments of the critical task alert system 100 will include other elements, modules, and features that cooperate to support the desired functionality. For simplicity, FIG. 1 only depicts certain elements that relate to the critical task alert techniques described in more detail below.

The at least one processor 102 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 102 may be realized as one or more microprocessors, controllers, microcontrollers, or state machines. Moreover, the at least one processor 102 may be implemented as a combination of computing devices, e.g., a combination of digital signal processors and microprocessors, a plurality of microprocessors, one or more microprocessors in conjunction with a digital signal processor core, or any other such configuration.

The at least one processor 102 communicates with system memory 104. The system memory 104 may be used to store electronic checklist data, including critical items and non-critical items. The system memory 104 may be realized using any number of devices, components, or modules, as appropriate to the embodiment. In practice, the system memory 104 could be realized as RAM memory, flash memory, EPROM memory, EEPROM memory, registers, a hard disk, a removable disk, or any other form of storage medium known in the art. In certain embodiments, the system memory 104 includes a hard disk, which may also be used to support functions of the at least one processor 102. The system memory 104 can be coupled to the at least one processor 102 such that the at least one processor 102 can read information from, and write information to, the system memory 104. In the alternative, the system memory 104 may be integral to the at least one processor 102. As an example, the at least one processor 102 and the system memory 104 may reside in a suitably designed application-specific integrated circuit (ASIC).

The user interface 106 may include or cooperate with various features to allow a user to interact with the critical task alert system 100. Accordingly, the user interface 106 may include various human-to-machine interfaces, e.g., a keypad, keys, a keyboard, buttons, switches, knobs, a touchpad, a joystick, a pointing device, CCD, a virtual writing tablet, a touch screen, a microphone, or any device, component, or function that enables the user to select options, input information, or otherwise control the operation of the critical task alert system 100. For example, the user interface 106 could be manipulated by an operator to make menu selections for purposes of viewing critical items for a particular phase of flight and/or summarized data associated with a particular critical item.

In certain embodiments, the user interface 106 may include or cooperate with various features to allow a user to interact with the critical task alert system 100 via graphical elements rendered on a display element. Accordingly, the user interface 106 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 106.

The various aircraft sensors and systems 108 may include any sensor or system onboard the aircraft for which supplemental data may assist a flight crew member in completing an electronic checklist item—more specifically, any electronic checklist item which may be "flagged" or otherwise identified as a critical item. The aircraft sensors and systems 108 may include, without limitation: other onboard systems like Engines, Hydraulics, and Fuel, and/or sensors that detect the cabin temperature, the cabin pressure, the fuel level, etc. For example, flaps and weight-on-wheel related information are provided by the Flight Control System. Although exemplary embodiments of the aircraft sensors and systems 108 are listed here, it should be appreciated that any aircraft onboard system or sensor may be used.

The data analysis module 110 is configured to identify critical items which require completion prior to a transition from the current phase of flight into a new phase of flight. The data analysis module 110 is further configured to initiate presentation of icons, text, and graphical elements, via at least one aircraft display device 112, to alert a flight crew of critical items associated with the current phase of flight. In some embodiments, the data analysis module 110 may trigger the opening of an electronic checklist display window via the at least one aircraft display device 112. In certain embodiments, the data analysis module 110 may receive user input selections (via the user interface 106) of a particular phase of flight or a particular critical item, and present additional data in response to these user input selections, such as summarized data associated with a particular aircraft sensor or system 108. The data analysis module 110 may suppress alerts presented by the aircraft for an incomplete task (i.e., critical item) after determining that a user is currently completing the corresponding incomplete checklist procedure.

In practice, the data analysis module 110 may be implemented with (or cooperate with) the at least one processor 102 to perform at least some of the functions and operations described in more detail herein. In this regard, the data analysis module 110 may be realized as suitably written processing logic, application program code, or the like.

The at least one aircraft display device 112 is configured to display various icons, text, and/or graphical elements associated with electronic checklists, aircraft sensors and systems 108 data, critical tasks/items from an electronic checklist, or the like. In an exemplary embodiment, the aircraft display device 112 is communicatively coupled to the user interface 106. The user interface 106 is communicatively coupled to the at least one processor 102, and the at least one processor 102 and the user interface 106 are cooperatively configured to display, render, or otherwise convey one or more graphical representations or images associated with electronic checklist data on the aircraft display device 112, as described in greater detail below. In an exemplary embodiment, the aircraft display device 112 is realized as an electronic display configured to graphically display electronic checklist data and/or summarized information associated with operation of various aircraft systems. In some embodiments, the aircraft display device 112 is located within a cockpit of the aircraft. It will be appreciated that although the at least one aircraft display device 112 may be implemented using a single aircraft display device 112, certain embodiments may use additional display devices to accomplish the functionality of the aircraft display device 112 described herein.

Figure 2:
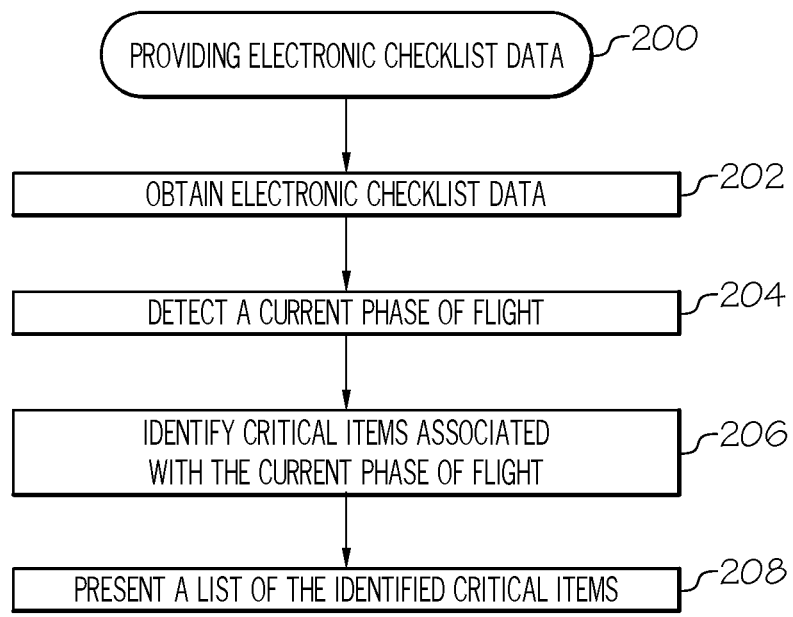
FIG. 2 is a flow chart that illustrates an embodiment of a process for providing electronic checklist data.

FIG. 2 is a flow chart that illustrates an embodiment of a process for providing electronic checklist data. For ease of description and clarity, this example assumes that the process 200 begins by obtaining electronic checklist data (step 202). An electronic checklist is a set of standard procedures used to verify aircraft operational status and/or to manage aircraft systems for safe operation. In certain embodiments, the electronic checklist data may be stored onboard the aircraft. For example, a database of electronic checklist data, including critical and non-critical items, may be stored onboard the aircraft. However, in other embodiments, the process 200 may obtain the electronic checklist data via external data communication connection (e.g., wireless communication to a remotely located server which is external to the aircraft). Electronic checklist data may be obtained via any suitable method of wired or wireless communication. Generally, aircraft software and databases are loaded onboard the aircraft after power up, including the electronic checklist data.

The process 200 then detects a current phase of flight (step 204). A phase of flight is an operational period within a flight, and may include, without limitation: standing (STD), pushback/towing (PBT), taxi (TXI), takeoff (TOF), initial climb (ICL), en route (ENR), maneuvering (MNV), approach (APR), landing (LDG), emergency descent (EMG), uncontrolled descent (UND), post-impact (PIM), and/or various sub-categories of these. The current phase of flight is generally determined by a flight management system (FMS) onboard an aircraft. However, certain embodiments of the process 200 may obtain data indicating a current phase of flight via any other aircraft onboard system capable of providing the data.

Next, the process 200 identifies critical items associated with the current phase of flight (step 206). An electronic checklist may include both critical and non-critical items. A critical item is a task included in an electronic checklist which is associated with a particular phase of flight, and which must be completed prior to the end of the associated phase of flight in order to operate the aircraft safely.

After identifying the critical items (step 206), the process 200 presents a list of the critical items (step 208). Here, the process 200 may present the critical items using various icons, text, and/or graphical elements on an aircraft display device. The process 200 may present the critical items as an alert, in response to user input selections, and/or using visual effects to distinguish the critical items from other display data. The process 200 presents the critical items as a safety precaution, in order to bring attention of the flight crew members to items or tasks on the electronic checklist for which completion is required in order to maintain safe operation of the aircraft.

Figure 3:
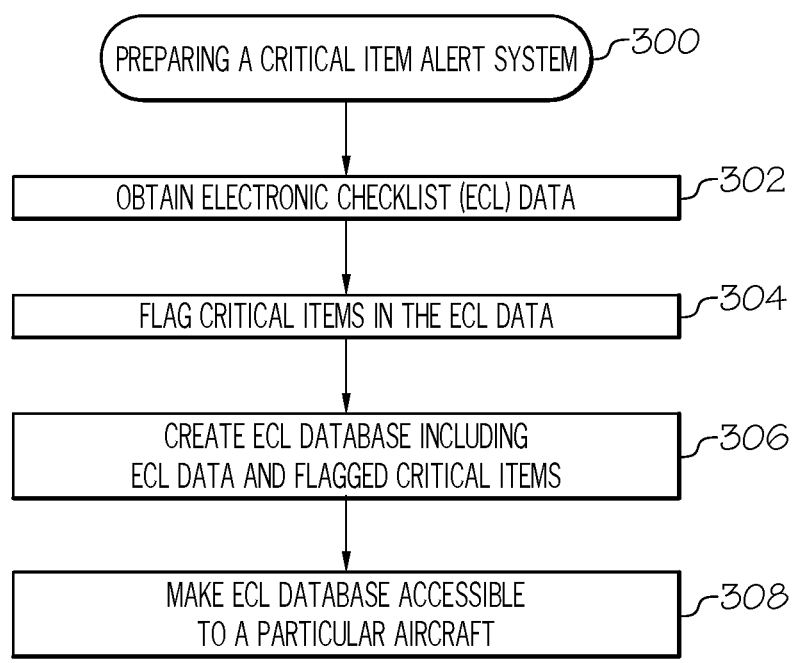
FIG. 3 is a flow chart that illustrates an embodiment of a process for preparing a critical task alert system.

FIG. 3 is a flow chart that illustrates an embodiment of a process 300 for preparing a critical task alert system. First, the process 300 obtains electronic checklist data (step 302). Electronic checklist data is associated with one or more phases of flight for a particular aircraft, and is modeled after standard paper checklists, which are commonly used in the industry, for the particular aircraft.

Next, the process 300 flags, or otherwise identifies, critical items in the electronic checklist data (step 304). The Electronic checklist database is created using a tool. The tool will be used to set various proprieties of the checklist items. Same process can be used to set the flag for the critical items during the design of the checklist database.

The process 300 then creates an electronic checklist database which includes the electronic checklist data and the flagged critical items (step 306), and makes the electronic checklist database available for access by a particular aircraft (step 308). The electronic checklist database may be loaded into system memory onboard an aircraft for use by that aircraft, or may be electronically accessible by a particular aircraft.

Figure 4:
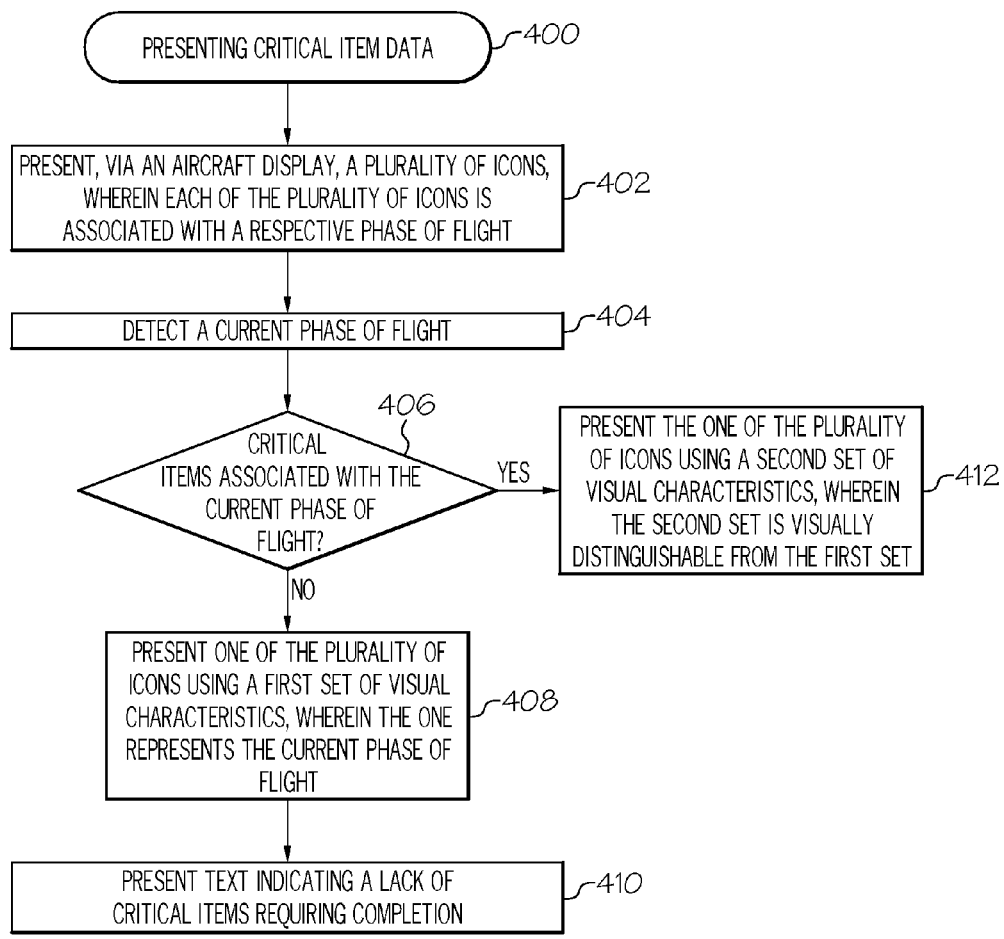
FIG. 4 is a flow chart that illustrates an embodiment of a process for presenting critical task data.
Figure 6:
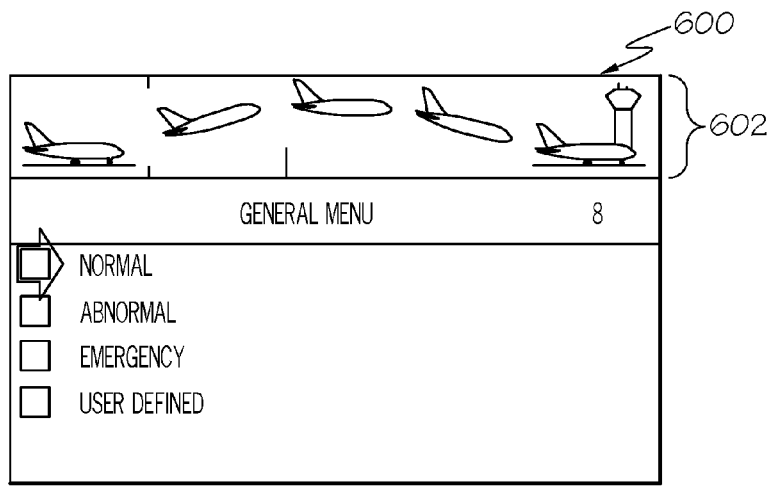
FIGS. 6-8 are graphical user interfaces (GUIs) associated with electronic checklist data, for display onboard an aircraft, in accordance with the disclosed embodiments.

FIG. 4 is a flow chart that illustrates an embodiment of a process 400 for presenting critical task data. First, the process 400 presents, via an aircraft display, a plurality of icons, wherein each of the plurality of icons is associated with a respective phase of flight (step 402). An exemplary embodiment of the plurality of icons is shown in FIG. 6, which is a graphical user interface (GUI) 600 associated with electronic checklist data, for display onboard an aircraft. As shown, the plurality of icons 602 are depicted across the top of the GUI 600. Each of the icons 602 represent a phase of flight applicable to a particular aircraft. It should be appreciated that the GUI 600 is an exemplary embodiment, and that other embodiments may include greater or fewer icons, which may represent additional phases and/or sub-phases of flight.

Returning to FIG. 4, the process 400 detects a current phase of flight (step 404). In exemplary embodiments, the process 400 obtains the current phase of flight data from a flight management system (FMS) onboard the aircraft, but other embodiments of the process 400 may obtain the current phase of flight from other aircraft onboard systems. The process 400 then determines whether there are critical items associated with the current phase of flight (decision 406). Here, the process 400 accesses an electronic checklist database that includes critical and non-critical items, and recognizes flagged critical items that require completion in a particular phase of flight.

Figure 7:
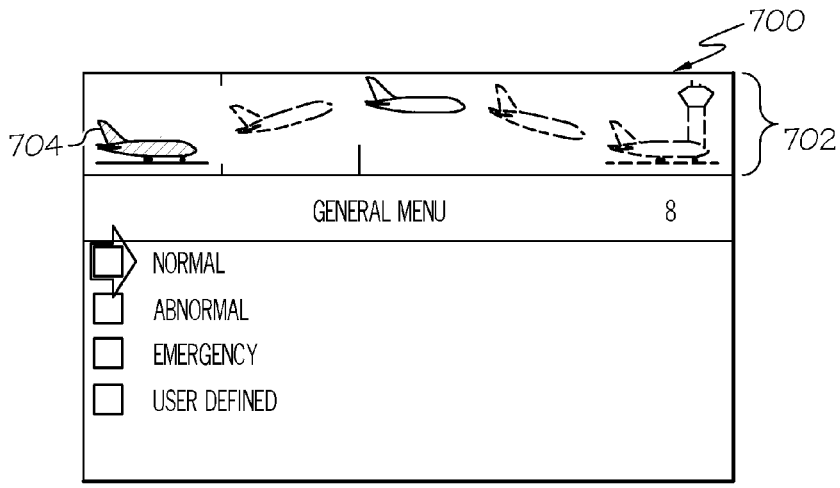

When there are no critical items associated with the current phase of flight (the "No" branch of 406), the process 400 presents the one of the plurality of icons using a first set of visual characteristics, wherein the one of the plurality of icons represents the current phase of flight (step 408). In certain embodiments, the process 400 may present text indicating a lack of critical items requiring completion (step 410). For example, if all of the critical items corresponding to the current phase of flight are complete, a text indicating the same status will be displayed. The first set of visual characteristics may include a particular color or visual effect, as shown in FIG. 7, which is a graphical user interface (GUI) 700 associated with electronic checklist data, for display onboard an aircraft. Similar to FIG. 6, the plurality of icons 702 are depicted across the top of the GUI 700, and each of the icons 702 represent a phase of flight applicable to a particular aircraft. As shown, a first icon 704 is represented as a filled-in icon, in contrast to the remaining icons 702 which are shown as hollow outlines.

Figure 8:
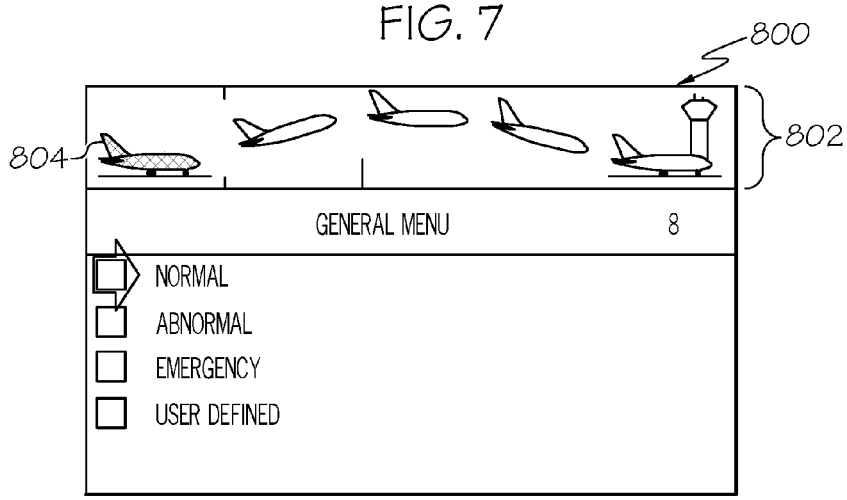

Returning to FIG. 4, when there are critical items associated with the current phase of flight (the "Yes" branch of 406), the process 400 presents the one of the plurality of icons using a second set of visual characteristics, wherein the second set is visually distinguishable from the first set (step 412). The second set of visual characteristics may include a different color or visual than the first set of visual characteristics (described above with regard to FIG. 7), as shown in FIG. 8, which is a graphical user interface (GUI) 800 associated with electronic checklist data, for display onboard an aircraft. Similar to FIGS. 6-7, the plurality of icons 802 are depicted across the top of the GUI 800, and each of the icons 802 represent a phase of flight applicable to a particular aircraft. As shown, a first icon 804 is represented as a filled-in icon, in contrast to the remaining icons 802 which are shown as hollow outlines.

Figure 5:
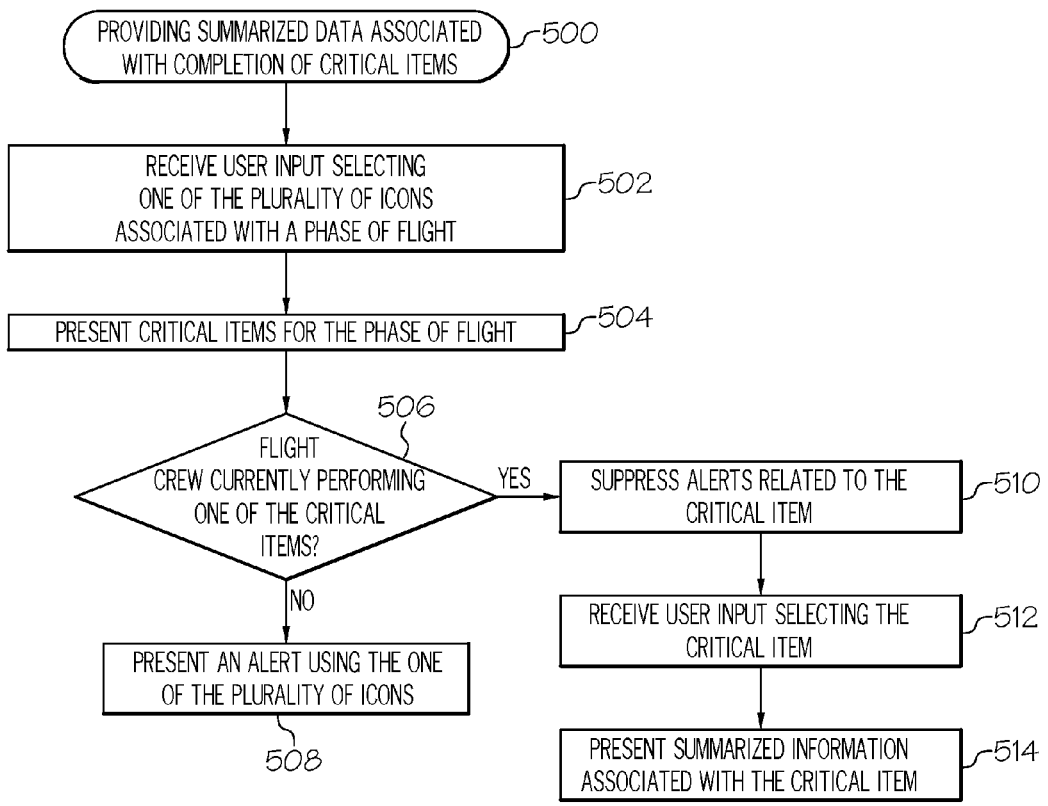
FIG. 5 is a flow chart that illustrates an embodiment of a process for providing summarized data associated with completion of critical tasks.

FIG. 5 is a flow chart that illustrates an embodiment of a process 500 for providing summarized data associated with completion of critical tasks. First, the process 500 receives user input selecting one of a plurality of icons, the one being associated with a particular phase of flight (step 502). Exemplary embodiments of icons representing phases of flight were described above, with regard to FIGS. 6-8. Once the phase of flight is selected by a user (step 502), the process 500 presents critical items for the phase of flight (step 504). Here, the process 500 provides a list of electronic checklist items that have been flagged or otherwise identified as a critical item, or in other words, an electronic checklist item for which completion is required during an associated phase of flight.

The process 500 then determines whether one of the critical items is currently being performed onboard the aircraft, by a flight crew member (decision 506). In exemplary embodiments of the invention, the process 500 may determine that one of the critical items is currently being performed when the checklist related to the applicable phase of flight is selected and open on the aircraft display. However, in other embodiments, the process 500 detects user input to an electronic checklist GUI (described above with regard to FIGS. 6-8), which may include user selection of a critical item or graphical element representative of a critical item, or a movement of a cursor over a text or graphical representation of the critical item on the aircraft display.

When the checklist related to the applicable phase of flight is not open, or the GUI representation of the critical item is not selected (or a cursor is not moved over the critical item), then the process 500 determines that the critical item is not currently being performed onboard the aircraft. When the one of the critical items is not currently being performed onboard the aircraft (the "No" branch of 506), the process 500 presents an alert via an aircraft onboard display device (step 508). In certain embodiments, the process 500 presents an alert that includes altering the color and/or other visual effect of an icon or other graphical element that represents the phase of flight. In some embodiments, this visual effect may include outlines, bold text, flashing light, or other visual effect used to attract the attention of a flight crew member.

When the one of the critical items is currently being performed onboard the aircraft (the "Yes" branch of 506), the process 500 suppresses alerts related to the critical item (step 510). Here, because the process 500 has determined that a flight crew member is already performing the critical task, the process 500 prevents an alert or alarm from triggering onboard the aircraft, which could distract the flight crew member from the critical task that requires completion during the current phase of flight.

Figure 9:
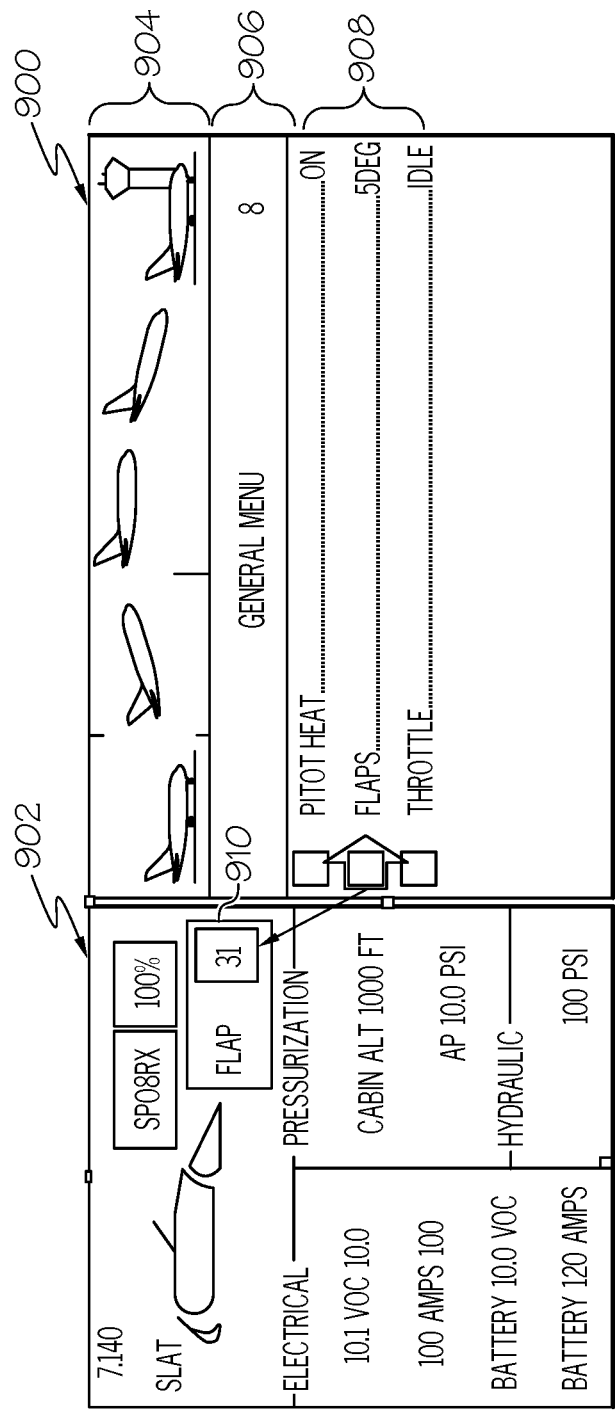
FIG. 9 is a GUI associated with electronic checklist data and a summary page, for display onboard an aircraft, in accordance with the disclosed embodiments.

The process 500 then receives user input selecting the critical item (step 512) and, in response, the process 500 presents summarized information associated with the critical item. This is shown in FIG. 9, which is a graphical user interface (GUI) 900 associated with electronic checklist data, and a summary page 902, for display onboard an aircraft. The GUI 900 depicts a plurality of icons 904 across the top of the screen, an indication 906 of the checklist title, and a list 908 of critical items associated with the current phase of flight. As shown, the critical item labeled "Flaps . . . 5 DEG" has been selected, as indicated by the outline around the words "Flaps . . . 5 DEG". Because "Flaps . . . 5 DEG" has been selected, a summary page 902 is displayed via an aircraft onboard display. The summary page 902 provides additional information for the flight crew, wherein the additional information is useful for performing the critical task. The summary page 902 will display all information derived from various onboard systems related to the critical items in a single window. Information related to a selected critical item is graphically differentiated, in this case by an outline around the Flaps readout in the summary page 902. Since the summary page 902 information is available at a single location, navigation and information gathering time is reduced, for the flight crew. Were this information not available via the summary page 902, the flight crew would be required to perform the time-consuming tasks of opening the Flight controls synoptic page and performing a visual search for the readout containing flaps actual position.

In situations where a flight crew member requires more detailed information (e.g., flaps position and other controls on the flight controls page), the flight crew member may double-click on an object in the summary page 902 to open additional, detailed information regarding a checklist item. In certain embodiments, double-clicking an object in the summary page 902 opens a flight controls page next to the electronic checklist information (e.g., the GUI 900). For example, a flight crew member may double-click the flaps readout 910 to open the flight controls page, which provides additional information regarding flaps position and other controls. It should be appreciated that, in other embodiments, any other detailed information associated with the checklist item may be presented in response to a user input selection (e.g., the double-click) of the checklist item.

Returning to FIG. 5, the various tasks performed in connection with processes 200-500 may be performed by software, hardware, firmware, or any combination thereof. For illustrative purposes, the following description of processes 200-500 may refer to elements mentioned above in connection with FIGS. 1 and 6-9. In practice, portions of process 200-500 may be performed by different elements of the described system. It should be appreciated that processes 200-500 may include any number of additional or alternative tasks, the tasks shown in FIGS. 2-5 need not be performed in the illustrated order, and processes 200-500 may be incorporated into a more comprehensive procedure or process having additional functionality not described in detail herein. Moreover, one or more of the tasks shown in FIGS. 2-5 could be omitted from embodiments of the processes 200-500 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing electronic checklist data onboard an aircraft, the method comprising:
    detecting, by an aircraft onboard system, a current phase of flight for the aircraft;
    obtaining electronic checklist data by at least one processor onboard the aircraft;
    identifying, by the at least one processor, critical items associated with the current phase of flight, wherein the electronic checklist data comprises the critical items;
    presenting the critical items via aircraft display;
    presenting, via the aircraft display, an icon associated with the current phase of flight;
    determining whether one or more of the critical items are associated with the current phase of flight;
    when one or more of the critical items are associated with the current phase of flight, presenting the icon using distinguishing visual characteristics;
    receiving user input selecting the icon associated with the current phase of flight;
    presenting a subset of the critical items associated with the current phase of flight;
    receiving indication that one of the subset is currently being performed onboard the aircraft; and suppressing aircraft onboard alerts associated with the one of the subset.

2. The method of claim 1, further comprising:
when one or more of the critical items are not associated with the current phase of flight, presenting the icon using a second set of distinguishing visual characteristics indicating a lack of the critical items requiring completion.

3. The method of claim 1, further comprising:
receiving user input selecting the one of the subset; and
presenting summarized information associated with the one of the subset.

4. The method of claim 1, further comprising:
detecting, by the aircraft onboard system, a change to a new phase of flight;
presenting, via the aircraft display, a second icon associated with the new phase of flight;
receiving user input selecting the second icon; and
presenting a second set of critical items associated with the new phase of flight.

5. The method of claim 4, further comprising:
receiving an indication that one of the second set of critical items is currently being performed onboard the aircraft; and
suppressing aircraft onboard alerts associated with the one of the second set.

6. The method of claim 5, further comprising:
receiving user input selecting the one of the second set; and
presenting summarized information associated with the one of the second set.

7. A system for providing electronic checklist data onboard an aircraft, the system comprising:
a system memory element, configured to store an electronic checklist database;
an aircraft display device configured to present critical items from the electronic checklist database;
a user interface configured to receive user input selections; and
at least one processor, communicatively coupled to the system memory element, the aircraft display device and the user interface, the at least one processor configured to:
detect a current phase of flight for the aircraft, via an aircraft onboard system;
access electronic checklist data stored by the system memory element;
identify critical items associated with a current phase of flight, wherein the electronic checklist data comprises the critical items;
present the critical items via the aircraft display device;
present, via the aircraft display device, an icon associated with the current phase of flight;
determine whether one or more of the critical items are associated with the current phase of flight;
when one or more of the critical items are associated with the current phase of flight, present the icon using distinguishing visual characteristics, via the aircraft display device;
receive user input, via the user interface, selecting the icon associated with the current phase of flight;
present a subset of the critical items associated with the current phase of flight, via the aircraft display device;
receive indication that one of the subset is currently being performed onboard the aircraft; and
suppress aircraft onboard alerts associated with the one of the subset.

8. The system of claim 7, wherein the user interface is configured to receive a user input selection of one of the critical items associated with the current phase of flight;
wherein the at least one processor is further configured to initiate presentation, via the aircraft display device, of aircraft system data associated with the one of the critical items.

9. The system of claim 8, further comprising a plurality of aircraft sensors and systems configured to obtain the aircraft system data;
wherein the at least one processor is communicatively coupled to the plurality of aircraft sensors and systems, and wherein the at least one processor is further configured to:
receive the aircraft system data from the plurality of aircraft sensors and systems;
summarize the aircraft system data in a form suitable for display, to create a summary; and
provide the summary to the aircraft display device.

10. The system of claim 8, wherein the user interface is further configured to:
receive user input selecting an icon associated with the current phase of flight; and
wherein the at least one processor is further configured to:
initiate presentation, via the aircraft display device, of the critical items associated with the current phase of flight, in response to the user input selection.

11. A non-transitory, computer-readable medium containing instructions thereon, which, when executed by a processor, perform a method for providing electronic checklist data onboard an aircraft, the method comprising:
detecting, by an aircraft onboard system, a current phase of flight for the aircraft;
obtaining electronic checklist data by at least one processor onboard the aircraft;
identifying critical tasks from an electronic checklist applicable to an aircraft, wherein the critical tasks comprise electronic checklist items requiring completion during a current phase of flight;
presenting the critical tasks via aircraft display onboard the aircraft;
presenting, via the aircraft display, an icon associated with the current phase of flight;
determining whether one or more of the critical items are associated with the current phase of flight;
when one or more of the critical items are associated with the current phase of flight, presenting the icon using distinguishing visual characteristics;
receiving user input selecting the icon associated with the current phase of flight;
presenting a subset of the critical items associated with the current phase of flight;
receiving indication that one of the subset is currently being performed onboard the aircraft; and
suppressing aircraft onboard alerts associated with the one of the subset.

12. The non-transitory, computer-readable medium of claim 11, wherein the method further comprises:
receiving user input selecting one of the presented critical tasks; and
presenting a summary of information related to the one of the presented critical tasks.

13. The non-transitory, computer-readable medium of claim 11, wherein the method further comprises:

presenting a plurality of icons, wherein each of the plurality of icons is associated with a respective phase of flight;

identifying the current phase of flight;

distinguishing one of the plurality of icons associated with the current phase of flight using a first set of visual characteristics;

receiving user input selecting the one of the plurality of icons; and when the one of the plurality of icons is selected, presenting the critical tasks.

14. The non-transitory, computer-readable medium of claim 11, wherein the method further comprises:

receiving a user input selection of one of the critical tasks; and presenting summarized data associated with the one of the critical tasks, in response to the user input selection.

15. The non-transitory, computer-readable medium of claim 14, wherein the method further comprises:

receiving a second user input selection of an object, wherein the summarized data comprises the object; and presenting a set of detailed data for a corresponding onboard system, in response to the user input selection, wherein the corresponding onboard system is associated with the one of the critical tasks.

16. The non-transitory, computer-readable medium of claim 11, wherein the method further comprises:

detecting a transition to a new phase of flight;

identifying incomplete ones of the critical tasks, wherein the incomplete ones are applicable to the current phase of flight; and storing the incomplete ones in system memory onboard the aircraft.

* * * * *